(12) United States Patent
Schrieber et al.

(10) Patent No.: US 8,148,023 B2
(45) Date of Patent: Apr. 3, 2012

(54) REGULATING AN OXIDIZER IN AN ELECTROCHEMICAL CELL PUMPING SYSTEM

(75) Inventors: Jeffrey W. Schrieber, Troy, NY (US); Jun Takeuchi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 738 days.

(21) Appl. No.: 12/270,351

(22) Filed: Nov. 13, 2008

(65) Prior Publication Data

US 2009/0136790 A1 May 28, 2009

Related U.S. Application Data

(60) Provisional application No. 61/190,037, filed on Nov. 13, 2007.

(51) Int. Cl.
*H01M 8/04* (2006.01)

(52) U.S. Cl. ......... 429/418; 429/422; 429/431; 429/410
(58) Field of Classification Search .................. None
See application file for complete search history.

(56) References Cited

U.S. PATENT DOCUMENTS

| | | | |
|---|---|---|---|
| 4,046,956 A * | 9/1977 | Fanciullo | 429/412 |
| 2006/0147771 A1* | 7/2006 | Russell et al. | 429/24 |
| 2006/0228598 A1* | 10/2006 | Venkataraman et al. | 429/20 |
| 2008/0152962 A1* | 6/2008 | Poonamallee et al. | 429/13 |

* cited by examiner

*Primary Examiner* — John S Maples
(74) *Attorney, Agent, or Firm* — Nelson Mullins Riley & Scarborough LLP; Anthony A. Laurentano

(57) ABSTRACT

A technique includes operating an electrochemical cell as a pump, including providing a current to the cell and providing a fuel flow to an anode chamber of the cell. The technique includes communicating an anode exhaust flow from the anode chamber to an oxidizer and controlling the current to regulate a temperature of the oxidizer.

8 Claims, 4 Drawing Sheets

REGULATING AN OXIDIZER IN AN ELECTROCHEMICAL CELL PUMPING SYSTEM

This application claims the benefit under 35 U.S.C. §119 (e) to U.S. Provisional Patent Application Ser. No. 61/190,037, entitled, "REGULATING AN OXIDIZER TEMPERATURE IN AN ELECTROCHEMICAL CELL PUMPING SYSTEM," which was filed on Nov. 13, 2007, and is hereby incorporated by reference in its entirety.

BACKGROUND

The invention generally relates to regulating an oxidizer temperature in an electrochemical cell pumping system.

A fuel cell is an electrochemical device that converts chemical energy directly into electrical energy. For example, one type of fuel cell includes a proton exchange membrane (PEM) that permits only protons to pass between an anode and a cathode of the fuel cell. Typically PEM fuel cells employ sulfonic-acid-based ionomers, such as Nafion, and operate in the 50° Celsius (C) to 75° C. temperature range. Another type employs a phosphoric-acid-based polybenzimidazole, PBI, membrane that operates in the 150° to 200° temperature range. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

Anode:$H_2 \rightarrow 2H^+ + 2e^-$   Equation 1

Cathode:$O_2 + 4H^+ + 4e^- \rightarrow 2H_2O$   Equation 2

The PEM fuel cell is only one type of fuel cell. Other types of fuel cells include direct methanol, alkaline, phosphoric acid, molten carbonate and solid oxide fuel cells.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one cell of the stack. The plates may include various surface flow channels and orifices to, as examples, route the reactants and products through the fuel cell stack. Electrically conductive gas diffusion layers (GDLs) may be located on each side of a catalyzed PEM to form the anode and cathodes of each fuel cell. In this manner, reactant gases from both the anode and cathode flow-fields may diffuse through the GDLs to reach the catalyst layers.

In general, a fuel cell is an electrochemical cell that operates in a forward mode to produce power. However, the electrochemical cell may be operated in a reverse mode in which the cell produces hydrogen and oxygen from electricity and water. More specifically, an electrolyzer splits water into hydrogen and oxygen with the following reactions occurring at the anode and cathode, respectively:

Anode:$2H_2O \rightarrow O_2 + 4H^+ + 4e^-$   Equation 3

Cathode:$4H^+ + 4e^- \rightarrow 2H_2$   Equation 4

An electrochemical cell may also be operated as an electrochemical pump. For example, the electrochemical cell may be operated as a hydrogen pump, a device that produces a relatively pure hydrogen flow at a cathode exhaust of the cell relative to an incoming reformate flow that is received at an anode inlet of the cell. In general, when operated as an electrochemical pump, the cell has the same overall topology of the fuel cell. In this regard, similar to a fuel cell an electrochemical cell that operates as a hydrogen pump may contain a PEM, gas diffusion layers (GDLs) and flow plates that establish plenum passageways and flow fields for communicating reactants to the cell. However, unlike the arrangement for the fuel cell, the electrochemical pump cell receives an applied voltage, and in response to the received current, hydrogen migrates from the anode chamber of the cell to the cathode chamber of the cell to produce hydrogen gas in the cathode chamber. A hydrogen pump may contain several such cells that are arranged in a stack.

SUMMARY

In an embodiment of the invention, a technique includes operating an electrochemical cell as a pump, including providing a current to the cell and providing a fuel flow to an anode chamber of the cell. The technique includes communicating an anode exhaust flow from the anode chamber to an oxidizer and controlling the current to regulate a temperature of the oxidizer.

In another embodiment of the invention, a technique includes driving an electrochemical cell stack with a current and communicating a fuel flow through an anode chamber of the stack. The communication produces an anode exhaust flow. The technique includes producing a purified fuel flow that originates in a cathode chamber of the stack in response to the acts of driving the cell and communicating the fuel flow to the anode chamber. The technique includes communicating an anode exhaust flow from the anode chamber to an oxidizer and controlling the current to regulate a temperature of the oxidizer.

In yet another embodiment of the invention, a system includes a power source, an electrochemical cell stack, an oxidizer and a control subsystem. The electrochemical cell stack includes an anode chamber to communicate a fuel flow to the anode chamber. The communication produces an anode exhaust flow. The electrochemical cell stack also includes a cathode chamber to produce a purified fuel flow in response to the communication of fuel to the anode chamber and the current. The oxidizer at least partially combusts anode exhaust flow, and the control system controls the current to regulate a temperature of the oxidizer.

Advantages and other features of the invention will become apparent from the following drawing, description and claims.

DETAILED DESCRIPTION

Figure 1:
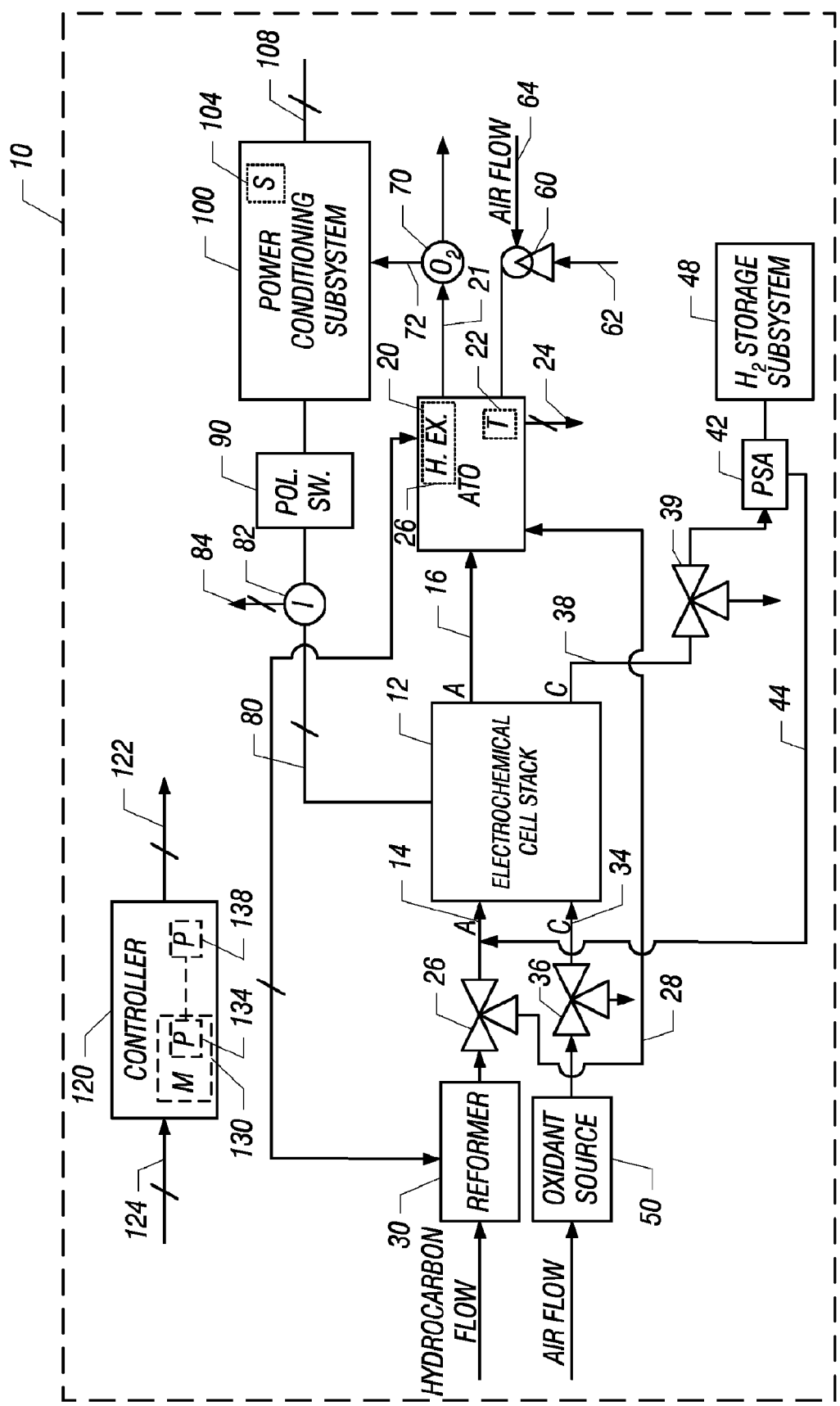
FIG. 1 is a schematic diagram of an electrochemical cell system according to an embodiment of the invention.

Referring to FIG. 1, an embodiment of an electrochemical cell system 10 in accordance with the invention includes a dual mode electrochemical cell stack 12 (a PEM cell stack, for example) that may function in one of two modes of operation: a power producing mode in which the stack 12 communicates fuel and oxidant flows and functions as a fuel cell stack to produce electrical power in response thereto; and a pumping mode in which the stack 12 receives a relatively lean incoming fuel flow and a current and functions as an electrochemical pump to produce a relatively rich outgoing fuel flow in response thereto.

More specifically, in the power producing mode, the stack 12 receives an incoming fuel flow at its anode inlet 14. The incoming fuel flow may be, as an example, reformate (50 percent hydrogen, for example), which is produced by a reformer 30 that reforms a hydrocarbon flow (a liquefied petroleum gas flow or a natural gas flow, as examples). The reformate that is produced by the reformer 30 may pass through one or more valves, such as the depicted three-way valve 26 on its way to the anode inlet 14. Inside the anode chamber of the stack 12, the fuel flow promotes electrochemical reactions, as described in Eq. 1. Not all of the hydrogen is consumed in the electrochemical reactions inside the stack 12. Instead, the fuel flow through the anode chamber of the stack 12 produces an anode exhaust at an anode outlet 16, which contains a certain amount of residual hydrogen. The electrochemical cell system 10 includes an anode tail gas oxidizer (ATO) 20, which combusts residual hydrogen in the anode exhaust flow, as further described below.

During the power producing mode, the stack 12 also communicates an oxidant flow, which is received from an oxidant source 50 (an air blower or air compressor, as examples) and is received at a cathode inlet 34 of the stack 12. As shown in FIG. 1, the oxidant flow from the oxidant source 50 may pass through one or more valves, such as a three-way valve 36, which establishes communication between the source 50 and the stack 12 during the power producing mode of the stack 12. The oxidant flow through the stack 12 produces a cathode exhaust flow 38 during the power producing mode. The cathode exhaust may be routed via a three-way valve 39 to ambient, to the ATO 20, back to the cathode 34 or anode 14 inlet, etc.

The electrical power that is produced by the stack 12 in the power producing mode may be routed to a power conditioning subsystem 100 of the system 10. In this regard, in the power producing mode, the stack terminals 80 communicate a DC stack voltage, which is converted by the power conditioning subsystem 100 into the appropriate form for one or more auxiliary loads and/or external loads of the system 10, which are coupled to output terminals 108 of the subsystem 100. The loads may be DC and/or AC loads.

In the pumping mode of the stack 12, a current is provided to the stack terminals 80, and the cathode inlet 34 of the stack 12 is closed off (via operation of the valve 36, for example). For this mode of operation, a fuel flow (a reformate flow, for example) is received at the anode inlet 14 and is communicated through the anode chamber of the stack 12 to produce an anode exhaust flow at the anode outlet 16. The anode exhaust flow contains residual hydrogen and is routed to the ATO 20 for combustion. The stack 12 responds to the reformate flow and the received current to cause hydrogen ions to migrate across the membranes of the stack 12 to produce relatively pure hydrogen in the cathode chamber of the stack 12. Thus, the cathode exhaust stream from the stack 12 (appearing at the cathode outlet 38) is a relatively pure, and thus, relatively richer fuel stream, than the fuel stream that flows through the anode chamber of the stack 12.

As depicted in FIG. 1, the electrochemical cell system 10 may include a pressure swing absorber (PSA) 42 that receives the flow from the cathode chamber of the stack 12 during the pumping mode. Thus, for the pumping mode, the valve 39 may be configured to route the cathode exhaust from the stack 12 through the PSA 42. In general, the PSA 42 removes impurities from the cathode exhaust stream to produce a substantially impurity free hydrogen stream that may be communicated to and stored in a hydrogen storage subsystem 48.

Intermittently, the PSA 42 undergoes a purge cycle in which a purge flow (an air flow or inert gas flow, as examples) is communicated through the bed(s) of the PSA 42 for purposes of removing impurities from the bed(s). The resulting purge flow is communicated from the PSA 42 through a purge line 44; and as shown in FIG. 1, the purge line 44 may route the purge flow back to the anode inlet 14.

In accordance with some embodiments of the invention, the power conditioning subsystem 100 supplies the current to the stack 12 during the pumping mode. Depending on the particular embodiment of the invention, in the pumping mode, the power conditioning subsystem 100 may supply the current using energy that is stored in energy storage 104 (a battery bank, for example) and/or energy that is derived from power that is supplied to the external terminals 108. As an example, in accordance with some embodiments of the invention, the power conditioning subsystem 100 may be connected to an AC power grid.

Regardless of the particular source of power, power is communicated from the power conditioning subsystem 100 to the stack terminals 80 during the pumping mode. Polarity switches 90 are operated to reverse the polarity of the stack terminals during the pumping mode (relative to the polarity of the terminals during the power producing mode) so that the power supplied in the pumping mode has the same direction as the current provided by the stack 10 in the power producing mode.

In the power producing and pumping modes, the anode exhaust stream from the stack 12 is routed into the ATO 20, which combusts residual hydrogen present in the stream with an oxidant flow that is provided by an oxidant source, such as an air blower 60. In this regard, the air blower 60 has a motor whose speed is controlled by a control signal 62 that is furnished by a controller 120. The air blower 60 receives an incoming air flow 64 and produces an outgoing air flow, an oxidant flow, which is received by the ATO 20 and which combusts with residual fuel from the anode exhaust in the combustion chamber of the ATO 20. The ATO 20 has an exhaust flow, which exits the ATO 20 at an exhaust outlet 21.

In accordance with some embodiments of the invention, the ATO 20 is used as a thermal energy source for purposes of producing steam that is used by the reformer 30 in a steam reformation process to convert the incoming hydrocarbon flow into the reformate flow that is provided to the stack 12. As an example, the ATO 20 may be located inside the reformer 30 and/or may contain a heat exchanger 26 that transfers thermal energy that is generated by the combustion created by the ATO 20 to a water stream for purposes of generating the reformation steam. As a result of this arrangement, the temperature of the ATO 20 directly affects the amount of reformate that is produced by the reformer 30. The level of reformate, in turn, affects the level of hydrogen that passes through the anode chamber of the stack 12 and on to the ATO 20.

For purposes of stabilizing the system 10 and maximizing its efficiency, the temperature of the ATO 20 may be regulated within a predefined range of temperatures. To achieve this regulation in the pumping mode of the stack 12, the controller 120 uses the stack current (i.e., the current flowing through the stack 12) as an indication of the hydrogen content of the anode exhaust (e.g., the molar hydrogen flow, for example). Using the stack current as an indicator of the hydrogen content in the anode exhaust flow, the controller 120 is able to regulate the ATO temperature to be within the predefined range of temperatures.

More specifically, in general, to raise the ATO temperature, the controller 120 decreases the stack current to decrease the hydrogen production of the stack 12 (i.e., decreases the amount of hydrogen ions being transferred from the anode chamber across the membranes of the stack 12 and into the cathode chamber) to therefore increase the level of residual hydrogen that is provided in the anode exhaust stream to the ATO 20. Conversely, in general, the controller 120 decreases the ATO temperature by increasing the hydrogen production of the pump (by increasing the stack current) to decrease the hydrogen content in the anode exhaust stream.

For purposes of performing the above-described functions, the system 10 may have various sensors. For example, the ATO 20 may include a temperature sensor 22, which has one or more output terminals 24 that provide an indication of the ATO temperature to the controller 120. Additionally, an oxygen sensor 70 may be coupled in the exhaust flow of the ATO 20 for purposes of sensing the level of oxygen present in the ATO's exhaust as indicated at output terminals 72 of the sensor 70. Alternatively, the oxygen sensor 70 may provide an indication when the oxygen level in the ATO's exhaust surpasses one or more predefined levels. Thus, many variations are contemplated and are within the scope of the appended claims.

For purposes of sensing the stack current, in accordance with some embodiments of the invention, the system 10 may include a current sensor 82 that is coupled in line with the stack terminals 80 and includes one or more output terminals 84 that indicate the acquired current measurement.

The controller 120 may control the stack current in one of many different ways, depending on the particular embodiment of the invention. As a non-limiting example, in accordance with some embodiments of the invention, the controller 120 controls operation of a DC-to-DC converter of the power conditioning subsystem 100 to regulate an output voltage of the converter based on the desired level of stack current. For example, the controller 120 may regulate a reference voltage used in a control loop of a switch mode DC-to-DC converter for purposes of controlling the output voltage of the converter to, in turn, control the stack current. Alternatively, the controller 120 may control a current limit of the converter to regulate the stack current. Other variations are contemplated and are within the scope of the appended claims.

As depicted in FIG. 1, in general, the controller 120 includes a memory 130 that stores program instructions 134, which when executed by a processor 138 of the controller 120 cause the controller 120 to perform various techniques that are related to the control and operation of the system 10. These techniques and operations include operations to regulate the ATO temperature, use the stack current as an indication of the hydrogen flow to the ATO 20, control the magnitude of the stack current for purposes of the ATO temperature regulation, etc.

In general, the processor 138 may include one or more microcontrollers and/or microprocessors, depending on the particular embodiment of the invention. The controller 120 includes various output terminals 122, which communicate commands, voltages, currents, control signals, etc., for purposes of controlling the overall operation of the system 10, operation of the reformer 30, operations related to regulating the ATO temperature, etc. Additionally, the controller 120 includes various input terminals 124 for purposes of receiving sensed values, commands, currents, voltages, output signals from sensors, etc.

It is noted that the system 10 is merely an example of one of many possible embodiments of an electrochemical cell system in which an electrochemical cell is configured to serve as a pump to produce purified hydrogen and regulate an oxidizer temperature based on and the cell current. Thus, many other variations of the system 10 are contemplated and are within the scope of the appended claims.

Figure 2:
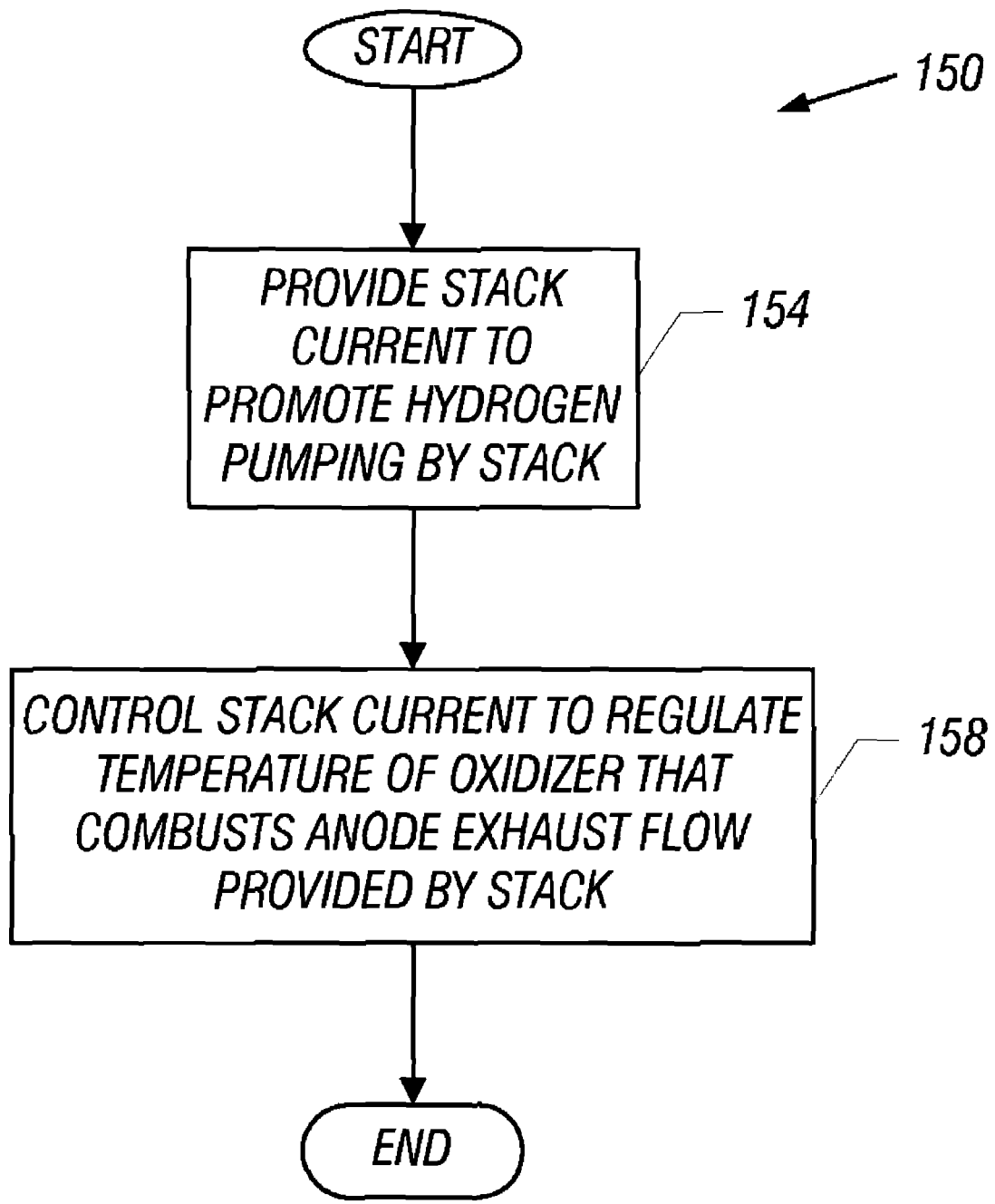
FIGS. 2 and 3 are flow diagrams depicting techniques to control a current of an electrochemical cell stack when the stack is being used to pump hydrogen according to an embodiment of the invention.

Referring to FIG. 2, to summarize, a technique 150 in accordance with the invention includes providing (block 154) a stack current to promote hydrogen pumping by a stack. The stack current is controlled (block 158) to regulate the temperature of an oxidizer that combusts an anode exhaust flow that is provided by the stack.

Figure 3:
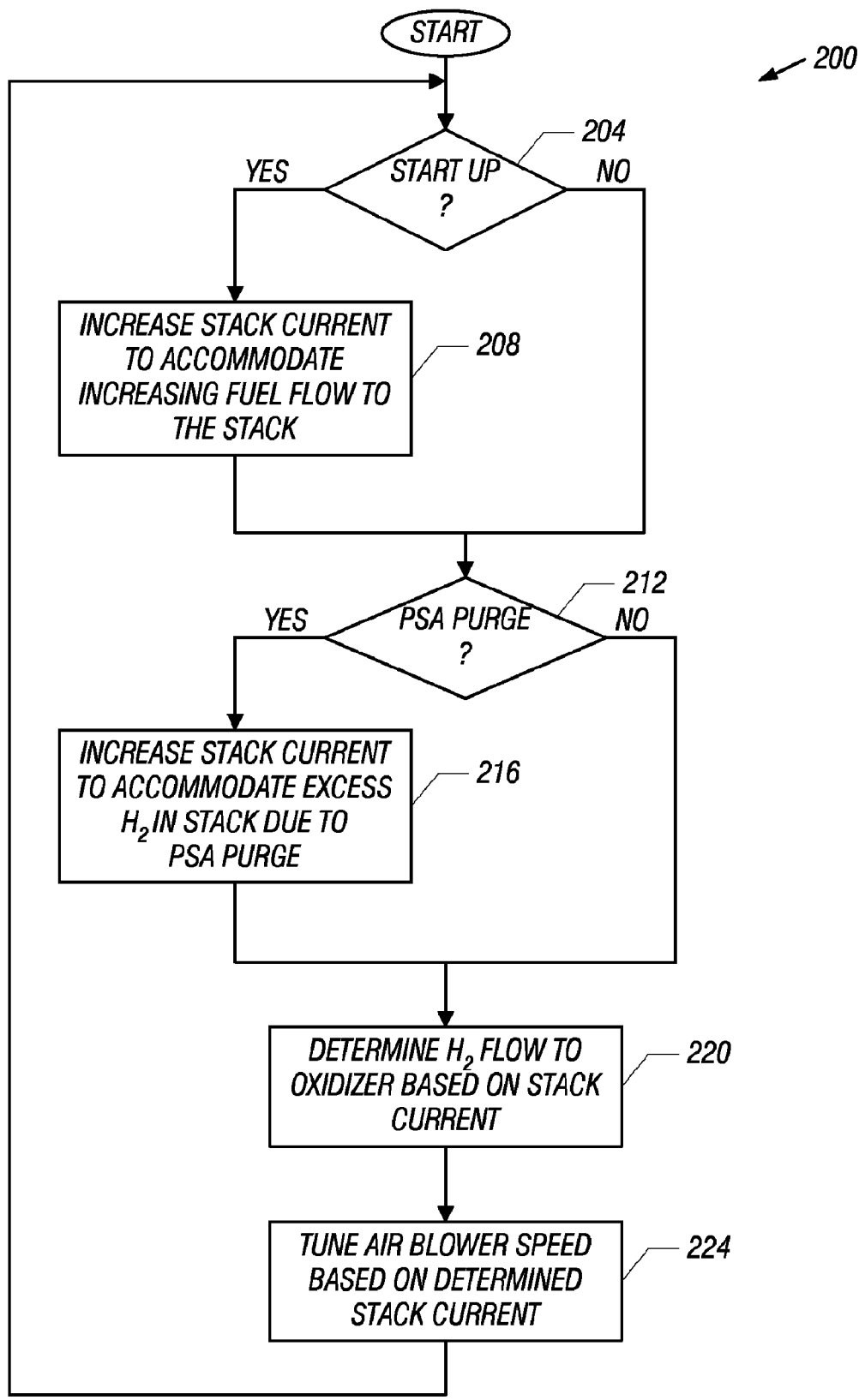

As a more specific example, FIG. 3 depicts a technique 200 that may be performed by the controller 120 in accordance with some embodiments of the invention, for purposes of regulating the ATO temperature. Pursuant to the technique 200, a determination is made (diamond 204) whether the pumping mode is in a start up phase. In this regard, in the start up phase, the system 10 increases, or ramps up, the fuel flow to the stack 12, as the reformer 30 is warming up and increasing its hydrogen production. The increased fuel flow through the stack 20, in the absence of other controls, generally causes an increase in the ATO temperature. For purposes of lowering the ATO temperature to within the controlled range of temperatures during the start up phase, the controller 120 increases (block 208) the stack current to accommodate the increased hydrogen fuel flow to the stack.

If the controller 100 determines (diamond 212) in the pumping mode that the PSA 42 is in a purge mode (i.e., the PSA 42 is causing a purge flow to flow through the purge line 44 to the anode inlet 14 and therefore introduce additional hydrogen into the anode chamber of the stack 12), then the controller 120 takes action to counter the excess hydrogen that is present in the anode chamber. In this regard, the controller 120 may increase the stack current to increase the stack's hydrogen production during the PSA purge, pursuant to block 216.

If the system 10 is in its normal mode of operation outside of the start up or PSA purge phases, the controller 120 generally controls the ATO temperature in the pumping mode pursuant to blocks 220 and 224. In this regard, the controller 120 determines (block 220) the hydrogen flow through the ATO 20 based on the stack current. Based on the determined stack current, the controller 120 tunes (block 224) the air blower speed. In other words, based on the determined hydrogen flow to the ATO 20, the controller 120 adjusts (if necessary) the control signal 62 to the air blower 60 for purposes of adjusting the air flow to the ATO 20.

Figure 4:
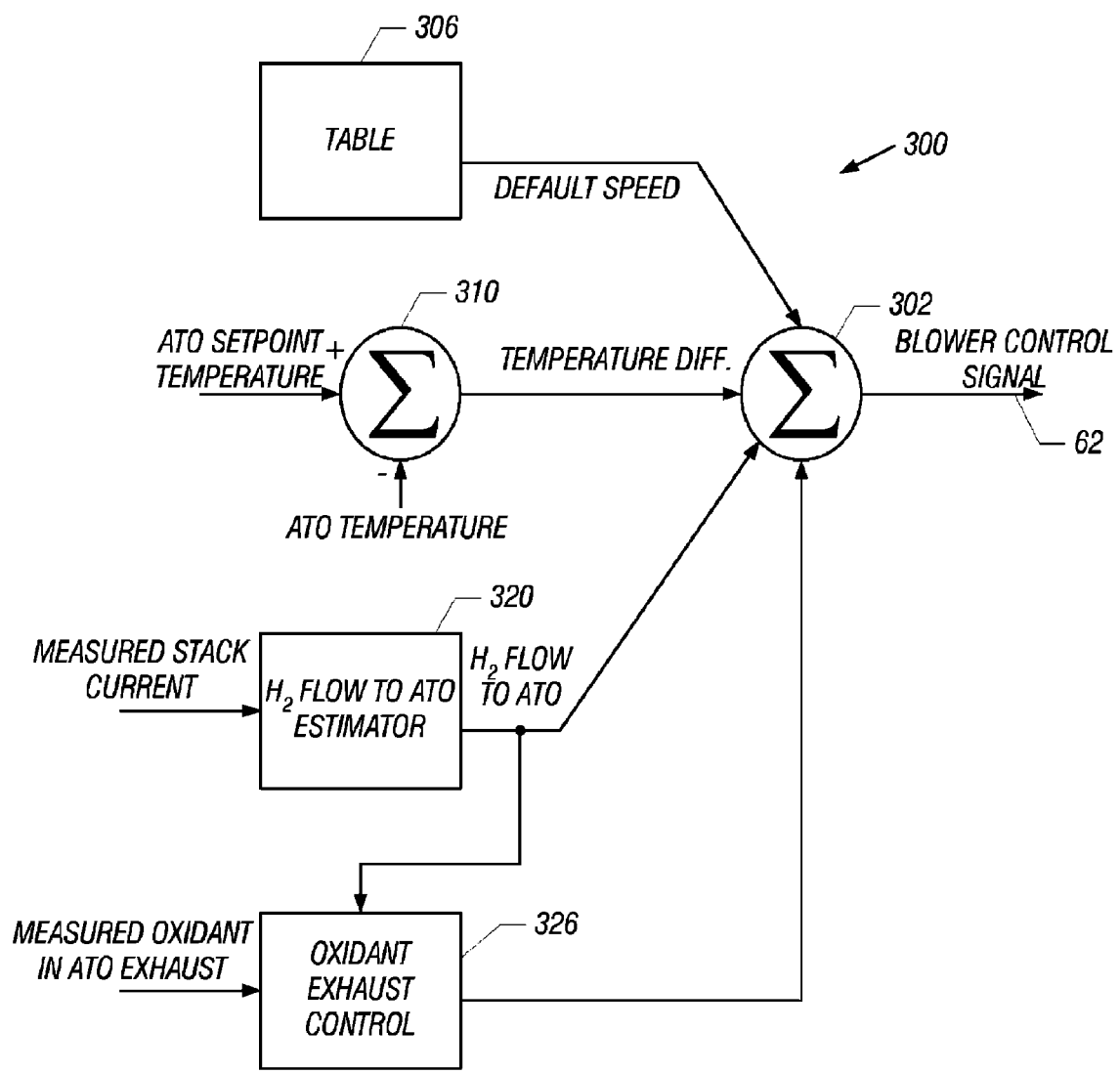
FIG. 4 is a block diagram illustrating a control scheme for generating a control signal for an air blower of an oxidizer of FIG. 1 according to an embodiment of the invention.

Referring to FIG. 4, in accordance with some embodiments of the invention, the controller 120 may use a control scheme 300 for purposes of generating the blower control signal 62 during the normal phase (i.e., the phase in which neither stack is being started up or shut down nor the PSA 42 is in a purge phase) of the hydrogen pumping mode. The controller 120 generates the blower control signal 62 based on a summation (as represented by adder 302) of various parameters that characterize the required oxidant flow to the ATO 20.

More specifically, the control scheme 300 may include a table 306 from which the controller 120 may determine a default speed setting of the blower 60. As examples, the default setting may be derived based on the particular phase of the pumping mode, the level of hydrogen being produced, etc. Another parameter that may be considered by the controller 120 is a temperature error, or temperature difference, between an ATO setpoint temperature and the measured ATO temperature (as indicated by the temperature sensor 22, for example). The controller 120 may also include at least one feedforward estimator, such as a hydrogen flow to the ATO 20 estimator 320. In general, the estimator 320 furnishes an estimate of the hydrogen flow to the ATO 20 based on the measured stack current (a current measured by the current sensor 82, for example). Additionally, in accordance with some embodiments of the invention, the controller 120 may consider a parameter derived from the estimated hydrogen flow to the ATO (as provided by the estimator 320) and the measured oxidant in the ATO exhaust (as provided by the oxygen sensor 70).

It is noted that the control scheme 300 that is depicted in FIG. 4 illustrates one out of many possible embodiments of the invention. Regardless of the particular control scheme that is used, the controller 120, in general, bases the control of the blower speed at least in part on the stack current.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
    a power source to provide a current;
    an electrochemical cell stack comprising:
        an anode chamber to communicate a fuel flow to the anode chamber, the communication producing an anode exhaust flow; and
        a cathode chamber to produce a purified fuel flow in response to the communication of fuel to the anode chamber and the current;
    an oxidizer to at least partially combust the anode exhaust flow; and
    a control subsystem to control the current to regulate a temperature of the oxidizer.

2. The system of claim 1, wherein the control subsystem is adapted to increase the current in connection with start up of the stack.

3. The system of claim 1, further comprising:
    a purifier to receive the anode exhaust flow.

4. The system of claim 1, wherein the purifier comprises a pressure swing absorber.

5. The system of claim 3, wherein
    the purifier is adapted to intermittingly purge itself and communicate a purge flow associated with the purging to the anode chamber of the stack, and
    the control subsystem is adapted to increase the current in response to the introduction of the purge flow into the anode chamber.

6. The system of claim 1, wherein the control subsystem is adapted to control the current to maintain the temperature of the oxidizer within a predefined range of temperatures.

7. The system of claim 1, further comprising:
    a sensor to measure the current, wherein
    the control subsystem is adapted to:
        estimate a hydrogen content of the anode exhaust flow based on the measurement; and
        control an oxidant flow to the oxidizer based at least in part on the estimated hydrogen content.

8. The system of claim 7, further comprising:
    an air blower to furnish the oxidant flow,
    wherein the control subsystem is adapted to control the speed of the blower based at least in part on the estimated hydrogen content.

* * * * *